Figure 1:
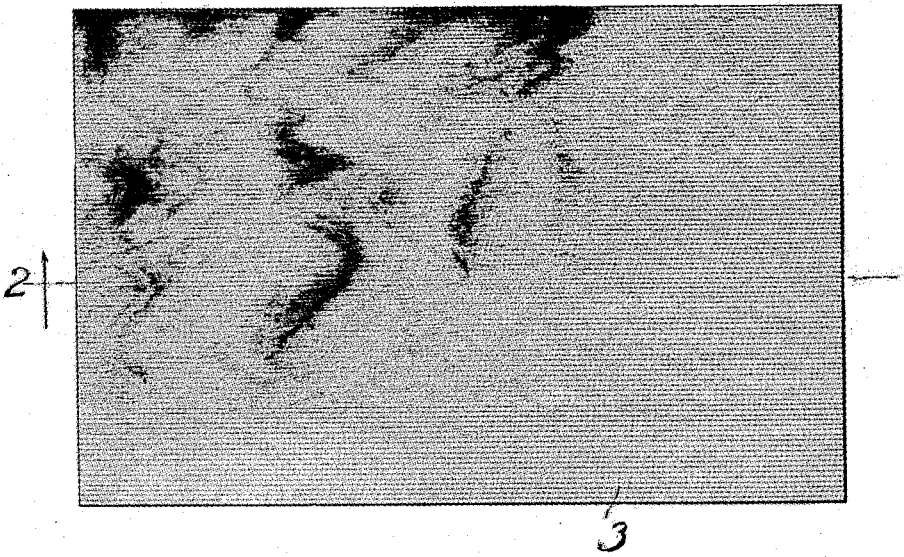

UNITED STATES PATENT OFFICE.

JOHN TULLY, OF CHICAGO, ILLINOIS.

METHOD OF ORNAMENTING GLASS.

No. 918,798.  Specification of Letters Patent.  Patented April 20, 1909.

Application filed April 6, 1908. Serial No. 425,357.

*To all whom it may concern:*

Be it known that I, JOHN TULLY, a citizen of the United States, residing at Chicago, in the county of Cook and State of Illinois, have invented a new and useful Method of Ornamenting Glass, of which the following is a specification.

My invention relates to an improvement in the art of ornamenting glass by applying different colors to a surface thereof affording the back, to produce for presentation to view on the opposite surface, variegated ornamental effects, in imitation of marble, onyx and other attractive surfaces.

The primary object of my invention is to provide a novel method of ornamentation by the practice thus generally referred to whereby the blending of the colors shall be rendered peculiarly effective; and to this end my improved procedure is the following:

The various desired colors being selected, which are preferably paints of the best quality, each color in suitable quantity—that chosen to predominate being in the greatest proportion and the other or others in lesser proportion—is mixed with a suitable binding and stiffening agent. Glue, varnish, a soluble silicate (preferably silicate of sodium) or the like may be used for the purpose in suitable quantity to render the mixture of a paste-like consistency, ranging in stiffness from that of thick molasses to the stiffness of moist putty. The several masses of these stiffened colors are then mixed together and worked, but only to a more or less slight extent, to incipiently or partly blend them, whereupon the mixture is applied as with a spatula to, and spread upon the surface of the glass to be ornamented, the spreading operation serving to further work the mixture and complete the blending of the colors, which are thereby caused to present little, if any, variegation on the back surface but a high degree of attractively blended variegation through the opposite surface. The glass is then left or exposed to a drying influence to dry and fix the spread mass upon the surface of the glass to which it is applied.

A sheet or plate of glass which has been treated in the manner described is illustrated in the accompanying drawing, in which—

Figure 2:
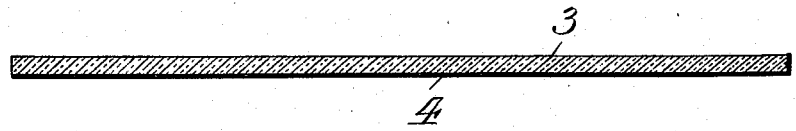

Figure 1 is a view of the finished article in front elevation, and Fig. 2 a cross-section of the same.

The glass 3 is of any suitable variety and quality, and may be in any desired shape adapting it to be operated upon in the manner described to cover the obverse surface thereof with the coating 4 composed of the mixture of different stiffened colors.

The gist of my invention consists in the successive blending treatments to which the mixture of preparatorily stiffened colors is subjected, since thereby its primary advantage is attained of enhancing to an extraordinary degree the blending of the colors and producing a high character of attractive ornamentation.

Where, as suggested, a silicate is used as the color-stiffening agent it is desirable to produce the drying by baking under a high degree of heat, say about 500° F., more or less, to intimately and firmly unite it with the surface of the glass and render the coating resistant to moisture, thereby augmenting its endurance when exposed to the elements, as when the article is employed for exposure out of doors.

What I claim as new and desire to secure by Letters Patent is—

1. The herein-described method of ornamenting glass, which consists in mixing each of a plurality of different colors separately with a stiffening agent, mixing together said stiffened colors to produce a partial blending thereof, spreading this mixture upon a surface of the glass to be ornamented and thereby further blending the colors, and drying the blended mixture on said surface.

2. The herein-described method of ornamenting glass, which consists in mixing each of a plurality of different colors separately with a stiffening agent and thereby forming a mixture of paste-like consistency, mixing together said stiffened colors to produce a partial blending thereof, spreading this mixture upon a surface of the glass to be ornamented and thereby completing the blending of the colors, and drying the blended mixture on said surface.

3. The herein-described method of ornamenting glass, which consists in mixing each of a plurality of different colors separately with a suitable silicate, as sodium silicate, to produce a stiff mixture, mixing together the colors so stiffened to produce a partial blending thereof, spreading this mixture upon a surface of the glass to be ornamented and thereby further blending the colors, and baking the blended mixture on said surface.

JOHN TULLY.

In presence of—
   A. U. THORIEN,
   R. A. SCHAEFER.